Dec. 7, 1965 J. O. IVIE 3,221,570
WIND DIRECTION AND TURBULENCE INDICATOR
Original Filed June 3, 1957 6 Sheets-Sheet 1
Fig. 1.
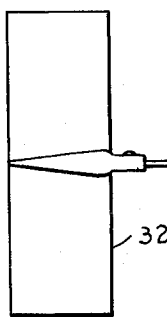
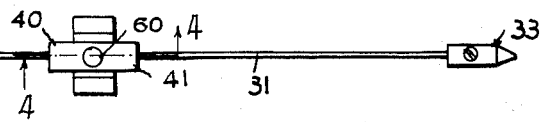
Fig. 2.
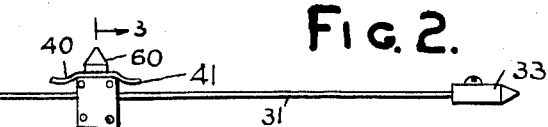
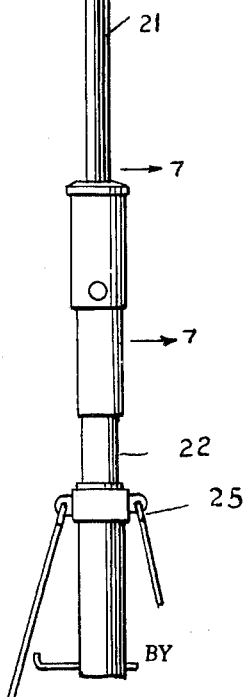
INVENTOR
JAMES O. IVIE
BY Holcombe, Wetherill + Brisebois
ATTORNEYS

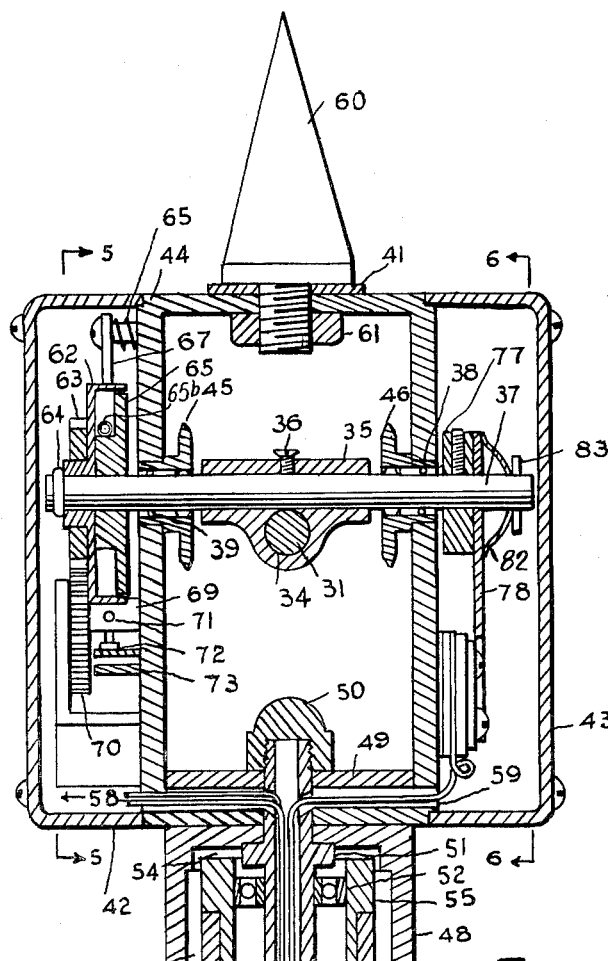

Dec. 7, 1965 J. O. IVIE 3,221,570
WIND DIRECTION AND TURBULENCE INDICATOR
Original Filed June 3, 1957 6 Sheets-Sheet 3

INVENTOR
JAMES O. IVIE
BY Holcombe, Wetherill & Brisebois
ATTORNEYS

Dec. 7, 1965 J. O. IVIE 3,221,570
WIND DIRECTION AND TURBULENCE INDICATOR
Original Filed June 3, 1957 6 Sheets-Sheet 5

INVENTOR
JAMES O. IVIE
BY Holcombe, Wetherill & Brisebois
ATTORNEYS

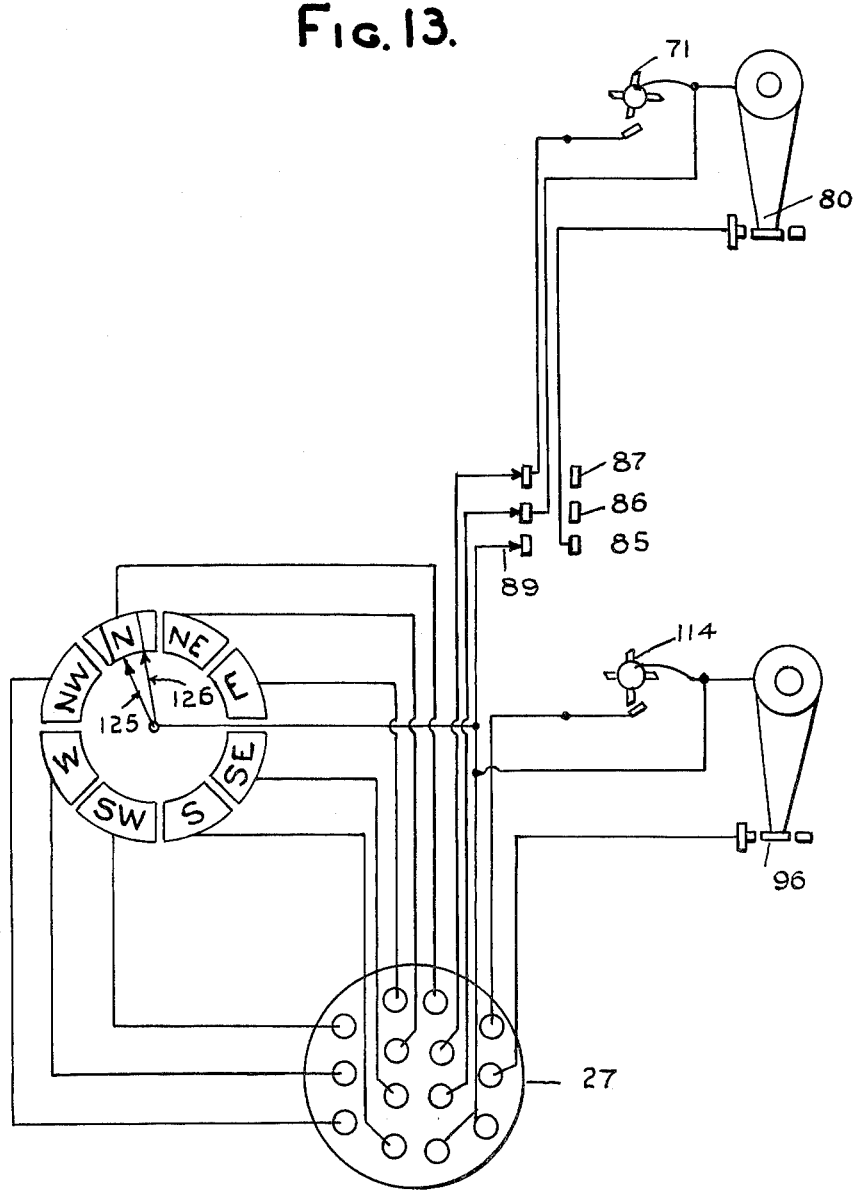

United States Patent Office 3,221,570
Patented Dec. 7, 1965

3,221,570
WIND DIRECTION AND TURBULENCE INDICATOR
James O. Ivie, 1019 Emerson Ave., Salt Lake City, Utah
Original application June 3, 1957, Ser. No. 663,200, now Patent No. 3,055,215, dated Sept. 25, 1962. Divided and this application Jan. 10, 1962, Ser. No. 173,599
4 Claims. (Cl. 74—126)

The present invention relates to a device for indicating the direction, and the turbulence of the wind in both the horizontal and vertical planes. This application is a division of application, Serial No. 663,200, filed June 3, 1957, now Patent 3,055,215.

It is an object of this invention to provide a device that will indicate the wind direction and measure the turbulence in both the vertical and horizontal planes.

It is also an object of this invention to provide a device that in addition to indicating direction will integrate the turbulent movements in one direction and register a count of the number of reversals so that the average magnitude of deviation of turbulent movement may be calculated in both the horizontal and vertical planes.

For a better understanding of its use, reference should be had to the accompanying drawings and descriptive matter in which have been illustrated and described preferred embodiments of the invention.

Figure 5:
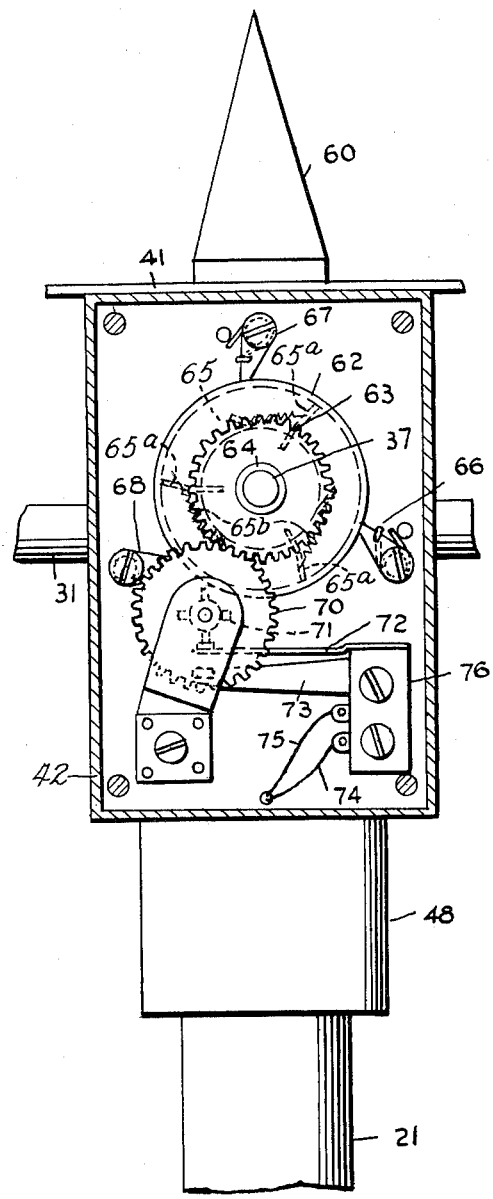
Figure 6:
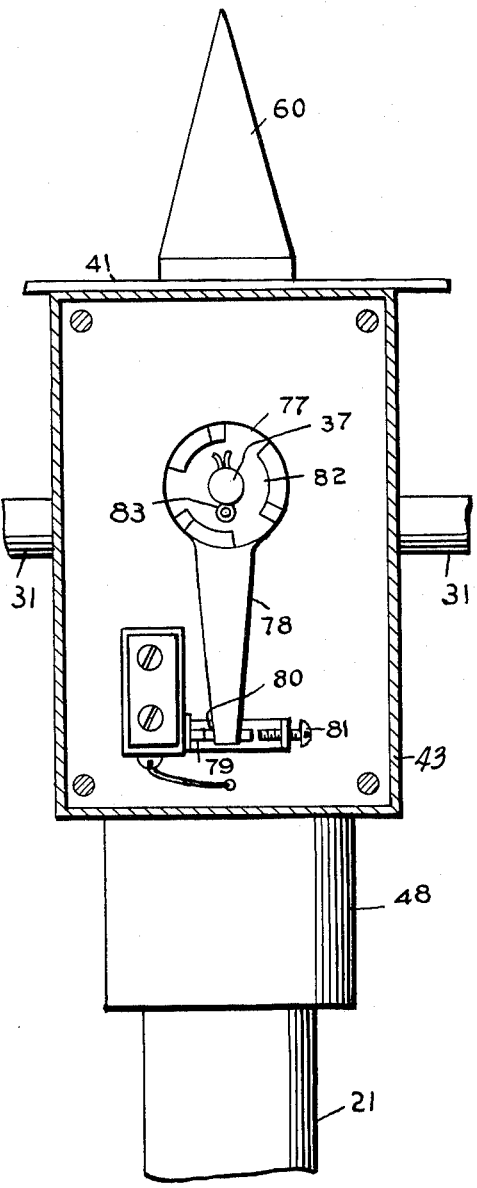
Figure 7:
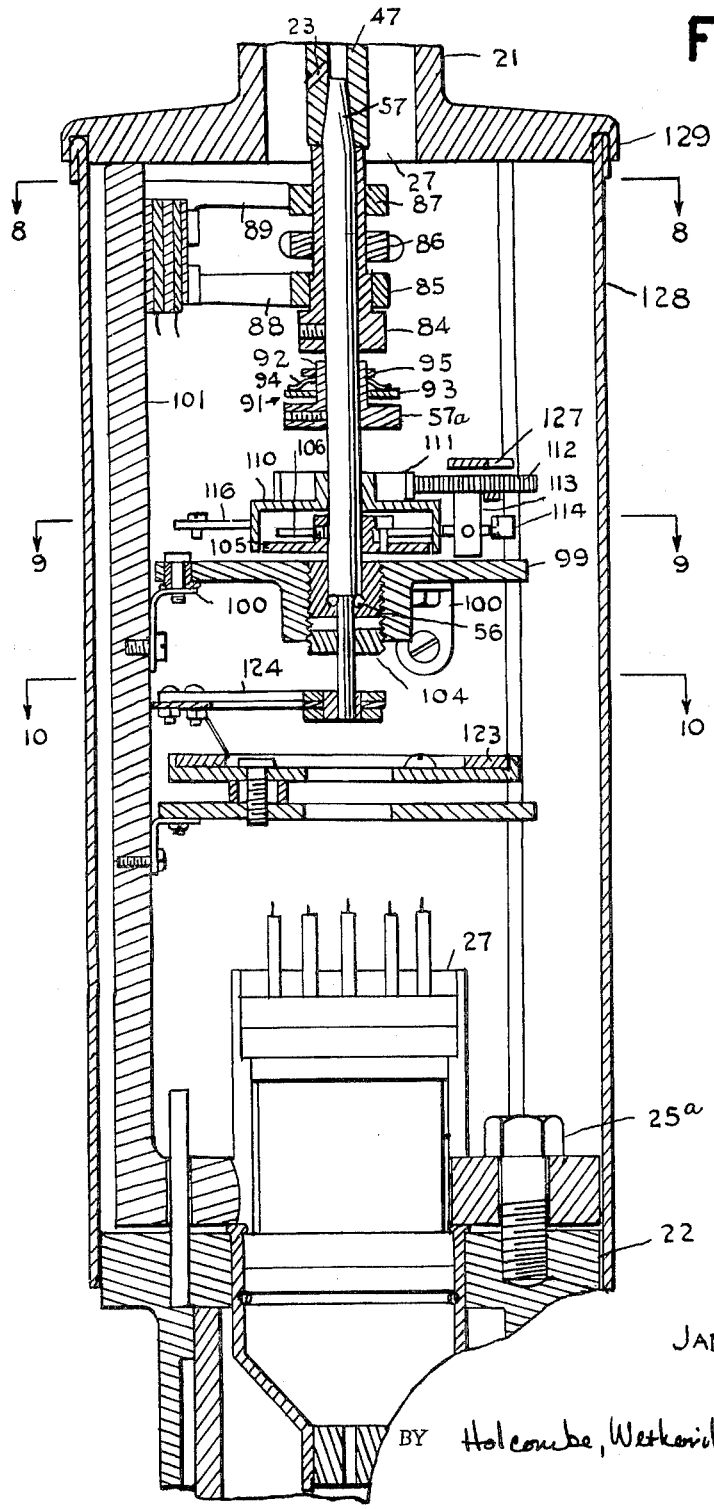
Figure 8:
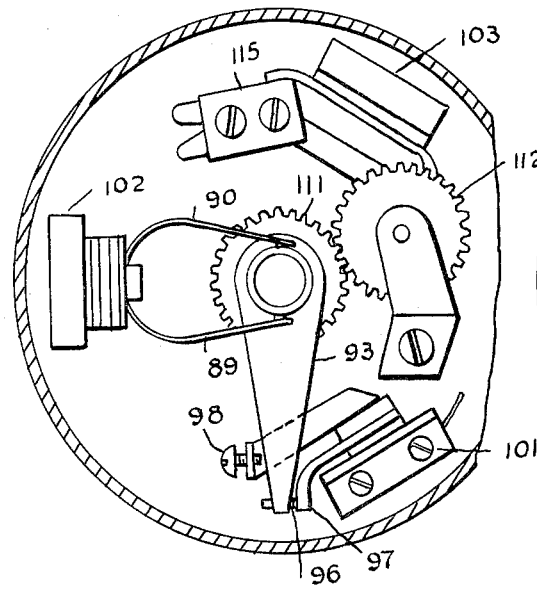
Figure 9:
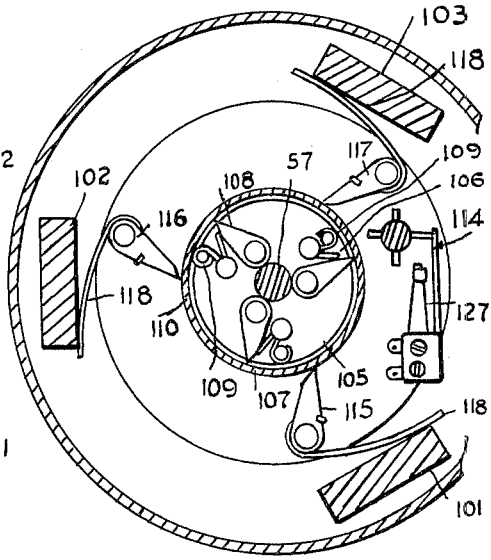
Figure 11:
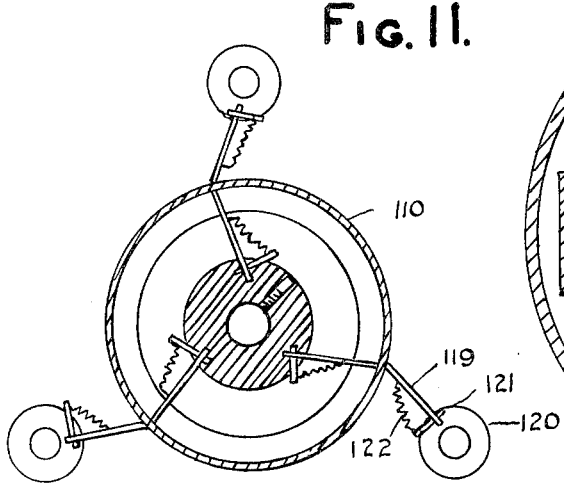
Figure 10:
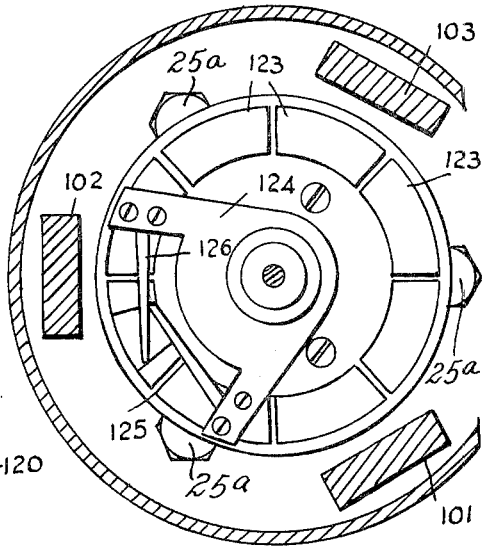
Figure 12:
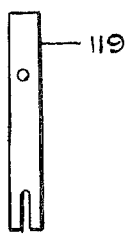

FIG. 1 is a top plan view of the vane assembly.
FIG. 2 is a side plan view of the vane assembly.
FIG. 3 is a view in section on line 3—3 of FIG. 2.
FIG. 3a is a view partially in section of the detail of the bearings shown in FIG. 3.
FIG. 4 is a view in section on line 4—4 of FIG. 1.
FIG. 5 is a sectional view on line 5—5 of FIG. 3.
FIG. 6 is a sectional view on the line 6—6 of FIG. 3.
FIG. 7 is a sectional view on line 7—7 of FIG. 2.
FIG. 8 is a sectional view on line 8—8 of FIG. 7.
FIG. 9 is a sectional view on line 9—9 of FIG. 7.
FIG. 10 is a sectional view on line 10—10 of FIG. 7.
FIG. 11 is a modification of the pawl shown in FIG. 9.
FIG. 12 is a plan view of a pawl shown in FIG. 11.
FIG. 13 is a wiring diagram.

Referring to the drawings, wherein like numerals refer to similar parts in the various figures:

The bivane is mounted on top of the weather tower 22, as shown in FIG. 2, by means of three bolts 25, shown in FIG. 7. On top of the main frame 21, shown in FIG. 2, is the movable head which contains the mechanism for the vertical counter and integrater. A shaft 31 is shown in FIGS. 1 and 2 and passes through this head and supports the bivane tail pieces 32, 32 at one end and the counterweight 33 at the other end. The shaft 31 passes through the opening 34 of the supporting pieces 35, shown in FIGS. 3 and 4. This part 35 is secured to the shaft 37 which crosses the shaft 31 at right angles and is secured to it by set screws 36. The shaft 37 is supported by the ball bearings 38 and 39 in the housing 44. This housing supports on one of its outer surfaces, adjacent to the shaft 37, the vertical integration mechanism, shown in FIG. 3, and in greater detail in FIG. 5. On the other surface of this housing, adjacent to the shaft 37 is the vertical counter mechanism shown in FIG. 3, and in greater detail in FIG. 6. The shaft 31 can rotate a limited distance in the vertical plane, usually a little more than 90° movement. This limit of rotation is fixed by the length of springs 40 and 41 which are shown in FIG. 2, but it is readily seen that the shaft 31 rotating about the shaft 37 would strike the spring 41 when the right hand end is raised to meet the spring.

The integration and counting mechanisms are protected by covers 42 and 43, respectively, shown in FIG. 3. The spring action of the springs 40 and 41 protects the shaft 31 and the tail pieces 32 from damage during excessive wind turbulence. In normal operation the turbulence movement never reaches the springs which act as stops.

The main head piece housing 44 is made from an extruded piece of rectangular tubing. Two ball bearing retainers 45 and 46 are shaped to give a drip edge for water and a groove to prevent water that is being driven on to the surface, from reaching these bearings during a rain storm. These retainers are pressed into the frame to support the ball bearings 38 and 39 from the vertical shaft 37. A storm cap 48, the frame 44 and the plate 49 have a keyed hole through which the shaft 47 passes. These are held in rigid relationship by the pressure of the nut 50 on the collar 51. The collar 51 is welded to the shaft 47 and becomes a rigid part of the shaft. The cap 48 protects the top radial ball bearings 52 from the weather. This cap also keeps the moisture out during a rain storm and it is constructed so as to have two chambers 53, 54. Air to get into each of these chambers must pass through an opening of close tolerance, then the expanded air permits the dust to settle and equalize before it passes through the next constriction and into the next chamber. This structure keeps the dust out of the ball bearing 52. A similar device is shown in FIG. 3 in connection with the bearings 45 and 46 and shown in greater detail in FIG. 3a. The ball bearings 52 are supported against the top of the main frame 21 by the bushing 55. None of the weight of the unit is supported on the bearings 52 which bearings only function to absorb radial thrust. The entire weight of the bivane is supported on the thrust bearing 56, shown in FIG. 7. A hardened steel pivot is machined on the shaft 57 which rigidly fits into the end of shaft 47 by a tapered fit, shown in FIG. 7. A small hole 23 in the hollow shaft 47 above the taper fit for 51 permits wires to be brought out for electrical connections to the commutator rings 85, 86 and 87. The plate 49 forms a sealing cover for the grooves or holes 58 and 59 through which the wires pass to the integrating mechanism for vertical turbulences and for the vertical counting mechanism. On top of the movable head is the point 60 held in position by a nut 61. This holds the springs 40 and 41 in place and serves as a lightning rod point for protection from lightning.

The vertical integration mechanism is shown in FIG. 5 wherein the shaft 37 has mounted on it a hollow brake drum 62 with a gear 63 mounted on its side. This fits snugly on the shaft 37 and is free to rotate about this shaft. A snap ring 64 keeps it in place. Inside the drum is a disc 65 shown in FIG. 3. On the frame 44 are mounted three dogs 66, 67 and 68. Each dog has a fine spring that keeps the point of the dog pressed against the smooth surface on the outside of the drum 62. A similar set of dogs and springs are mounted on the disc 65 on the inside of the drum 62. The disc 65 is secured rigidly to the shaft 37 by set screws or by a press fit. The internal dogs can turn the drum 62 in one direction only but not in the other. The external dogs prevent any reverse rotation of the drum. The combination makes the shaft 37 turn the drum when it rotates in one direction, but does not allow the drum to rotate when the shaft rotates in the other direction. However, the shaft is free to rotate in either direction. In this way it adds up all of the movements of the vane in one direction so that all vertical oscillations can be integrated in degrees of movement in one direction. The gear 63 meshes with the gear 70 shown in FIGS. 3 and 5, and rotates shaft 69 that supports this gear. On this shaft are mounted the electrical contacts 71.

A Phosphor bronze spring 72 has a silver contact point which touches the electrical contacts on the shaft 69 each time the electrical contacts pass the spring. The gearing system is arranged so that one contact passes for every 100° of movement in the shaft. The leaf 73 insures a good electrical centact for the ground side of the gear 70 so that the current need not flow through the pivot point of the gear. The gear 70 has a loose fit for its pivot as shown in FIG. 5. Wire connections are made to the insulated spring contact arms 72 and 73 by the wires 74 and 75. While in the above description a shaft having contact points thereon is described, a shaft rotating an electrical resistance similar to that used in a potentiometer could be employed.

The counting mechanism is shown in FIGS. 3 and 6. A collar 77 is secured to the shaft 37 by means of a set screw. Against this collar is a loosely fitting member 78 which is held in place by a special spring 82 made of a thin sheet of Phosphor bronze and cut so that it has three pressure points, holding members 78 against the collar 77. A cotter key 83 or a collar with a set screw holds the spring against the leaf 78. This leaf member has a lever arm which has a silver contact point 80 at the extremity thereof. The movement is limited between the electrical contact 79, which is insulated from the frame and the contact screw 81 which is grounded to the frame as is the leaf 78. When the shaft 37 rotates in a clockwise direction, as shown in FIG. 6 it will press contacts 79 and 80 together. This will ground the contact 79 and cause a count to be registered at the recorder. When the movement is counter-clockwise the leaf 78 moves back against the stop 81. This distance is limited to a distance of .002 inch. These springs 82 grip the leaf 78 with such light pressure that collar 77 and spring 82 can turn freely when the leaf 78 does not turn. The movement of 78 is so small that all turbulence movements exceed this amount. The movement beyond the limit amount is taken up by a slippage of the leaf 78 between the collar 77 and the spring 82. Thus all movements in one direction make contact while all movements in the reverse direction open the contact.

FIG. 7 is a cross sectional view of the lower part of FIG. 2 showing the operating mechanism that indicates a horizontal wind direction and turbulance integrator and counter, while the device, described in FIGS. 3 and 4 indicates the turbulence in the vertical plane. On shaft 57 just below the joint between this shaft and the hollow shaft 47 is a commutator 84, having three silver rings 85, 86 and 87 that are connected with the vertical integrating mechanism, shown in FIG. 3, and the vertical counter mechanism, also shown in FIG. 3, on the head of the instrument. The bottom ring 85 is the return ground lead. However, the wire carries the electrical connection from this ring to the vertical head mechanism so that the current need not pass through the bearing pivot to reach the operating contact. The other two commutators 86 and 87 to the insulated connection of the vertical part, shown in FIGS. 5 and 6 and the leaves with silver contacts 88, 89 and 90 carry the current from the rings 85, 86 and 87 to their respective connections in the plug 27, shown at the bottom of FIG. 7. Just below the commutator 84 is mounted a movement counter mechanism for horizontal turbulence, shown in FIG. 7 at 91. This mechanism is identical in structure and operation to that explained for the vertical counter mechanism, shown in FIGS. 3 and 6. A collar 57, shown in FIGS. 7 and 8 is provided, against which the lever arm 93 is pressed by the spring 94 with the amount of spring pressure being regulated by the setting of the collar 95. The contact point 96 on the arm 93 makes contact with the insulated point 97 when it is rotated in one direction and its movement is limited by means of the set screw 98 in one direction, and the contact point in the other direction.

Just below the counter mechanism 91, just described, is a horizontal turbulence integrator mechanism, which operates in a manner similar to the vertical turbulence integrator mechanism, shown in FIGS. 3 and 5. The circular plate 99 is the support for the entire movable part of this mechanism, and is itself supported by means of bracket 100 attached to each of the three uprights 101, 102 and 103, shown in FIG. 8. These uprights are fastened by means of the bolt 25 to the weather tower 22. The thrust bearings 56 take the entire weight of the head. An adjustable screw 104 is provided to raise or lower the bearing so that the head of the bivane may have the clearance that is needed. The disc 105, shown in FIGS. 7 and 9, is secured to the shaft 57 by means of a set screw, not shown. On this disc 105, are a set of three dogs 106, 107 and 108 held by their respective springs 109, shown in FIG. 9, one for each dog to keep the point of the dog pressed against the inside surface of the drum 110, shown in FIG. 9. A gear 111, shown in FIGS. 7, 8, is a part of the drum 110 and rotates with the drum and meshes with the gear 112 and rotates its shaft 113, which has four silver contact points thereon. These points make contact on the rotation of the drum with the contact head 114, shown in FIGS. 7 and 9. The gear 112 has pivoted bearings in the plate 99 (not shown). These bearings do not allow good electrical contact between the moving part and the stationary part. In order to avoid this, a ground connection 127 is provided. The stationary circular plate 99 has mounted thereon a set of three dogs 115, 116, and 117 with their respective springs 118, holding these dogs in contact with the drum 110 and prevent its motion in a clockwise manner, as shown in FIG. 9. The inner dogs 106, 107 and 108 drive it in a counter-clockwise manner on rotation of the shaft 57.

The operation of the integrating mechanism may be explained in connection with FIG. 9, wherein a set of three dogs 115, 116 and 117 are held in contact by means of their respective springs with the drum 110 and prevent its rotation in a clockwise direction. If the drum has a tendency to turn in a clockwise direction, the pressure of the points of the dogs will increase and as the drum is made of a softer metal than the dogs, these points will actually dig into the surface of the drum to stop the counter-clockwise motion. If the drum 110 rotates in a counter-clockwise direction the dogs 115, 116 and 117 will release it, to decrease the pressure and allow the drum to turn freely. The set of three dogs 106, 107 and 108 mounted on the interior of the drum are arranged so that they will increase their pressure and grip on the drum 110 when the disc 105 rotates in a counter-clockwise direction, but will decrease the pressure and rotate freely in a clockwise direction. This disc 105 is held against the shaft 57, which is rotated by the shaft 47, which in turn moves with the horizontal movement of the shaft 31, which is constantly rotating back and forth with the vane, in accordance with the wind turbulence. All of the counter-clockwise motion transmitted will pull the drum 110 with it in a counter-clockwise direction. The result is that the vane can move freely in both directions, but it will only turn the drum 110 with it in one direction. All of this motion is transmitted to the shaft 113 and the count of the rotation of this shaft is indicated electrically by the contact 114. These electrical impulses are transmitted by the necessary wiring (not shown) to the plugs 27.

Another modification of the dog arrangement, shown in FIGS. 5 and 9, is shown in FIG. 11, wherein the dogs 119, shown in FIG. 12, are arranged with their slotted ends fitting into a slot in post 120, having a pin 121 therein which holds the dogs in position by fitting in the notch the part 119 shown in FIG. 12. The outer end of pin 121 holds the ends of the spring 122, which holds the dogs 119 in contact with the drum 110, and keeps the dogs 119 pressed firmly into their mounting slots. A similar arrangement of the internal dogs is also shown in FIG. 11.

FIG. 11 shows a low cost form of construction. This system permits the use of light springs, and in operation the closer the dogs are brought to the point where the dogs will slide past the drum without digging into the surface, the lighter the springs 112 and 118, or the interior spring 109 can be. The friction of operation becomes very small with decreased spring pressure. The parts shown in FIGS. 11 and 12 are designed to overcome the accurate machining operation required to construct the parts shown in FIGS. 5 and 9. The dog 119 may be stamped with a die out of thin sheet spring steel in the shape shown. It will slip with one end into the slot near the outer end of the post 120. A spring 122 is locked through the hole at one end of the dog 119 and attached to the pin 121 at the other end. The pin goes through a slot in the supporting post into which the dog fits. The notch straddles this pin in the opening in the post and prevents any side slipping of the dogs. The spring holds the dog against the bottom of the slot which acts as a pivot for the dog. The same spring also holds the other end of the dog against the drum so that it will prevent the drum 110 from moving in one direction, but will allow it to move in the other direction. On the inside of the drum 110 are similar arrangements of dogs.

The wind direction system is shown in FIGS. 7 and 10. Eight contact segments 123 are arranged, as shown in FIG. 10. The moving arm 124 is rigidly connected to the end of the shaft 57 below the thrust bearing, as shown in FIG. 7. This arm 124 has two light contact springs 125 and 126 arranged thereon. These springs are shown in FIG. 10 and have silver contact points on the ends thereof. They are clamped to the two arms of the part 124. The contacts are arranged to make their best contact at the extreme end of the point so that the accurate spacing of the contact area is maintained. One of the segments is marked so as to allow the setting of the segments in the true north position and for a reference in setting the spread of the contact points. This is indicated in FIGS. 10 and 13. The contact springs 125 and 126 make contact right up to the edge of these markings on the segments. This amount of spread between the ends of the contact springs 125, 126 allows the direction contact to make contact with each single segment for 22½° only, and it makes contact with two adjacent segments for 22½°. The light pressure exerted by the springs 125 and 126 makes the weather vane very sensitive to low wind velocity and decreases the friction as low as possible. This arrangement was developed to reduce the friction and increase the sensitivity of low wind velocity. A good contact is obtained by using silver to silver contact or other metals having equal conductivity, such as gold and platinum. As the springs 125 and 126 are comparatively long with respect to the distance between the arm 124 and the segment plate 123, the angle of contact with the segment plate is nearly parallel and the friction is thereby greatly reduced. A cover 128 is mounted on the outside of the mechanism shown in FIG. 7 and fits into the groove 129 in the main frame 21, forming a weather tight fit therein. This cover 128 is held in position by means of a fastener (not shown) and upon being released will slide axially down the assembly so as to give access to the mechanism therein.

In the wiring diagram, shown in FIG. 13, all of the connections are made to the plug 27. Thus plug is shown at the bottom of FIG. 7. The vertical turbulence integrator contact point 80 makes contact through the commutor ring 85 and the wiper arm 89 to the plug 27. The counter mechanism electrical contact 71 forms a circuit through the ring 87 to the plug 27. The ground to both the counter and the turbulence integrator makes contact through the ring 86. The horizontal counter contact points 96, shown in FIG. 8, and the horizontal integrator contact head 114, shown in FIG. 7, are also connected to the plug 27, with the appropriate ground lead as shown. The wind indicator segments are connected as shown to appropriate terminals on the plug 27 and the two contact springs 125 and 126 are indicated by the pointers in the wiring diagram, shown in FIG. 13, and these pointers are connected by a common lead to the plug 27.

In operation the wind causes the shaft 31 to oscillate in the vertical and in the horizontal planes. Every time the shaft moves in the vertical plane the counter mechanism, shown in FIG. 6, closes the contact and allows an electrical pulse to be delivered to the plug 27, and on returning to its original position, the amount of movement is indicated by the integrator shown in FIG. 5, which is transmitted by the appropriate contact thereon to the plug 27.

A similar horizontal counter and integrator are operated in the main body of the instrument. The wind direction is indicated by the position of the contact springs on the appropriate segment or segments of the split ring plate. These are also connected to plug 27 which plug is in turn connected to the proper indicating dial or recorder, not shown, which may be remotely located with respect to the weather tower, hereinabove described.

While in accordance with the provisions of the statute the best forms and embodiment of this invention known have been illustrated and described, it will be apparent to those skilled in the art that changes may be made in the form of the apparatus disclosed, without departing from the spirit of this invention as set forth in the accompanying claims, and that in some cases certain features of this invention may be used without a corresponding use of other features.

What is claimed is:

1. A mechanism to integrate the rotation in one direction only of a shaft comprising in combination:
    (a) a shaft free to rotate in both directions,
    (b) A hollow drum surrounding said shaft,
    (c) a friction clutch mounted on said shaft and rotating therewith, said clutch comprising a plurality of spring loaded pawls contacting at an acute angle the interior of said drum, each of said pawls being sharpened at the point of contact, and transmitting the rotation of said shaft in one direction only to said drum,
    (d) similar pawls contacting the exterior surface of the said drum to prevent said drum from rotating in the opposite direction from the rotation transmitted by said clutch,
    (e) a means associated with said drum to transmit the rotation thereof.

2. A device as claimed in claim 1, wherein said pawls are harder than the said drum.

3. A device as claimed in claim 1, wherein said pawls are hard metal and said drum is of softer metals.

4. A device as claimed in claim 1, wherein said pawls are stamped from sheet steel having a notch at one end thereof and a spring retaining hole near the other end therof, said notch fitting within a pawl retaining post having a pawl receiving slot therein, and a pin transversely located in said slot, said pin being received within the notch in the end of the pawl, and a retaining spring between the end of said pin and the spring receiving hole in said pawl.

References Cited by the Examiner

UNITED STATES PATENTS

| 420,057 | 1/1890 | Haight | 340—325 |
| 492,011 | 2/1893 | Haight | 340—325 |
| 907,574 | 12/1908 | Danzinger | 74—577 |
| 2,796,830 | 6/1957 | Hilton | 101—93 |

MALCOLM A. MORRISON, *Primary Examiner.*